United States Patent
Andersen et al.

(10) Patent No.: US 12,111,689 B2
(45) Date of Patent: Oct. 8, 2024

(54) EXTENDED REALITY HEADSET POSITIONING AND STABILIZATION

(71) Applicant: Meta Platforms Technologies, LLC, Menlo Park, CA (US)

(72) Inventors: Blake Francis Andersen, Snoqualmie, WA (US); Quintin Morris, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/138,918

(22) Filed: Apr. 25, 2023

(65) Prior Publication Data

US 2023/0259164 A1 Aug. 17, 2023

Related U.S. Application Data

(63) Continuation of application No. 17/364,822, filed on Jun. 30, 2021, now Pat. No. 11,669,127.

(51) Int. Cl.
*G06F 1/16* (2006.01)
*H04N 13/332* (2018.01)

(52) U.S. Cl.
CPC ........... *G06F 1/163* (2013.01); *H04N 13/332* (2018.05)

(58) Field of Classification Search
CPC .............................. G06F 1/163; H04N 13/332
See application file for complete search history.

(56) References Cited

U.S. PATENT DOCUMENTS

| 10,321,751 B1 | 6/2019 | Magrath |
| 2012/0033142 A1 | 2/2012 | Thomson |

(Continued)

FOREIGN PATENT DOCUMENTS

| CN | 108107586 A | 6/2018 |
| CN | 109212761 A | 1/2019 |

(Continued)

OTHER PUBLICATIONS

Office Action for U.S. Appl. No. 17/364,822, mailed on Sep. 21, 2022, Andersen, "Extended Reality Headset Positioning and Stabilization" 10 pages.

(Continued)

*Primary Examiner* — Fernando Alcon
(74) *Attorney, Agent, or Firm* — McDermott Will & Emery LLP

(57) ABSTRACT

An extended reality headset is configured to position and stabilize the headset on a face when worn. For example, the headset can include an external frame with first and second side pieces coupled to a display structure and configured to provide lateral stabilization. In some examples, the headset can include a front head-engaging structure front head-engaging structure that is rotationally coupled to the external frame via a pivot point. The headset can also include a rear head-engaging structure coupled the external frame. In some examples, the rear head-engaging structure can include a tensioning mechanism to adjust the headset to fit various head shapes. Additionally, the headset can include a flexible strap coupled to the front head-engaging structure and the tensioning mechanism. In some examples, applying tension to the flexible strap by the tensioning mechanism can cause the front head-engaging structure to rotate along the pivot point, providing a secure fit.

20 Claims, 5 Drawing Sheets

(56) References Cited

U.S. PATENT DOCUMENTS

| | | |
|---|---|---|
| 2013/0194682 A1 | 8/2013 | Sahu |
| 2013/0222235 A1 | 8/2013 | Abdollahi et al. |
| 2015/0316773 A1 | 11/2015 | Tazbaz et al. |
| 2016/0062125 A1 | 3/2016 | Baek et al. |
| 2016/0062454 A1 | 3/2016 | Wang et al. |
| 2017/0011706 A1 | 1/2017 | Namkung et al. |
| 2017/0192198 A1 | 7/2017 | Bristol et al. |
| 2017/0270635 A1 | 9/2017 | Chun et al. |
| 2018/0059715 A1* | 3/2018 | Chen .................. G06F 1/1632 |
| 2018/0095497 A1 | 4/2018 | Hsu et al. |
| 2018/0164849 A1 | 6/2018 | Chan |
| 2018/0348812 A1 | 12/2018 | Miller et al. |
| 2018/0364491 A1 | 12/2018 | Park et al. |
| 2018/0373371 A1 | 12/2018 | Kim |
| 2019/0138049 A1 | 5/2019 | Serota |
| 2019/0364355 A1 | 11/2019 | Tan et al. |
| 2020/0174552 A1 | 6/2020 | Stafford et al. |
| 2020/0225493 A1 | 7/2020 | Yu et al. |
| 2020/0257333 A1 | 8/2020 | Han et al. |
| 2021/0080996 A1 | 3/2021 | Hudman et al. |
| 2021/0216099 A1* | 7/2021 | Goodner ............... G06F 1/163 |
| 2021/0255663 A1 | 8/2021 | Chen et al. |
| 2021/0302750 A1* | 9/2021 | Law ..................... G06F 3/011 |
| 2021/0381639 A1 | 12/2021 | Howard et al. |
| 2022/0121237 A1 | 4/2022 | VanBlon et al. |
| 2022/0146838 A1 | 5/2022 | Homma et al. |
| 2022/0187609 A1 | 6/2022 | Snyder et al. |
| 2022/0299779 A1* | 9/2022 | Zhang ................. H05K 5/0086 |
| 2022/0369023 A1 | 11/2022 | Gui |
| 2023/0004186 A1 | 1/2023 | Andersen |
| 2023/0205265 A1* | 6/2023 | Oka .................. G02B 27/0176 |
| 2024/0111163 A1* | 4/2024 | Law ..................... G06F 1/163 |

FOREIGN PATENT DOCUMENTS

| | | |
|---|---|---|
| CN | 110596902 A | 12/2019 |
| CN | 111474725 A | 7/2020 |
| CN | 112433375 A | 3/2021 |
| CN | 213276137 U | 5/2021 |
| WO | WO2018023939 A1 | 2/2018 |

OTHER PUBLICATIONS

Copy of International Search Report and Written Opinion for International Application No. PCT/US2022/032529, mailed Sep. 12, 2022, 12 pages.

* cited by examiner

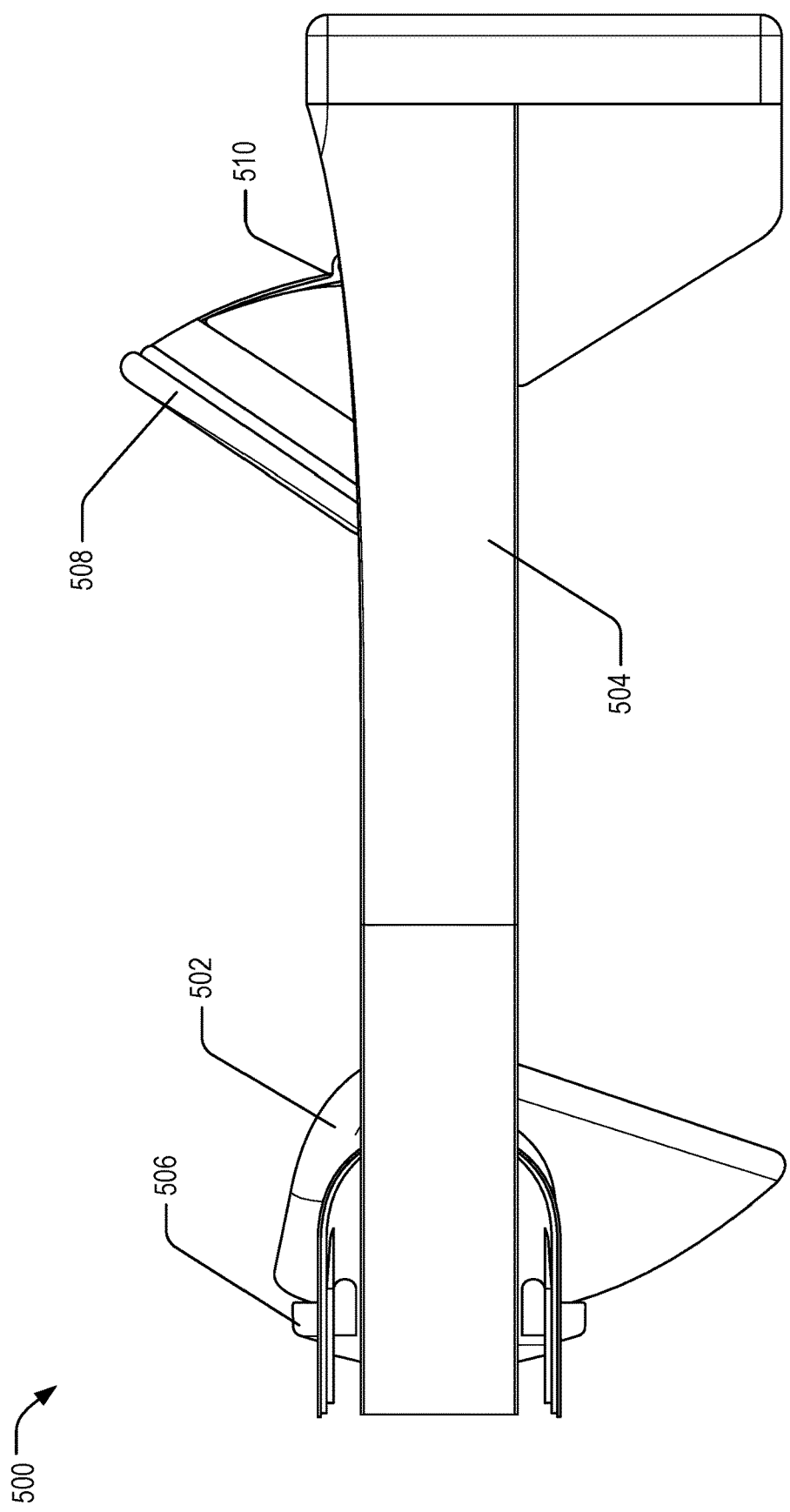

EXTENDED REALITY HEADSET POSITIONING AND STABILIZATION

RELATED APPLICATIONS

This application claims priority to and is a continuation of U.S. patent application Ser. No. 17/364,822, filed on Jun. 30, 2021, the entire contents of which are incorporated herein by reference.

BACKGROUND

Recent years have seen significant advancement in extended reality experiences. Indeed, extended reality (e.g., virtual reality, augmented reality, mixed reality, etc.) has grown in popularity, and technological advancements have facilitated its use in a variety of applications, such as gaming, online shopping, military training, and tourism. However, conventional extended reality hardware, such as headsets worn when participating in extended reality, provides limited functionality for users of extended reality systems who have differing head shapes or facial bone structure to secure such headsets comfortably and precisely to their faces. This imprecise fit often results in discomfort, preventing users from fully and comfortably utilizing the full potential provided by extended reality systems.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 5 illustrates a side view of an example headset stabilization device including an example rear head-engaging structure.

DETAILED DESCRIPTION

Figure 1:
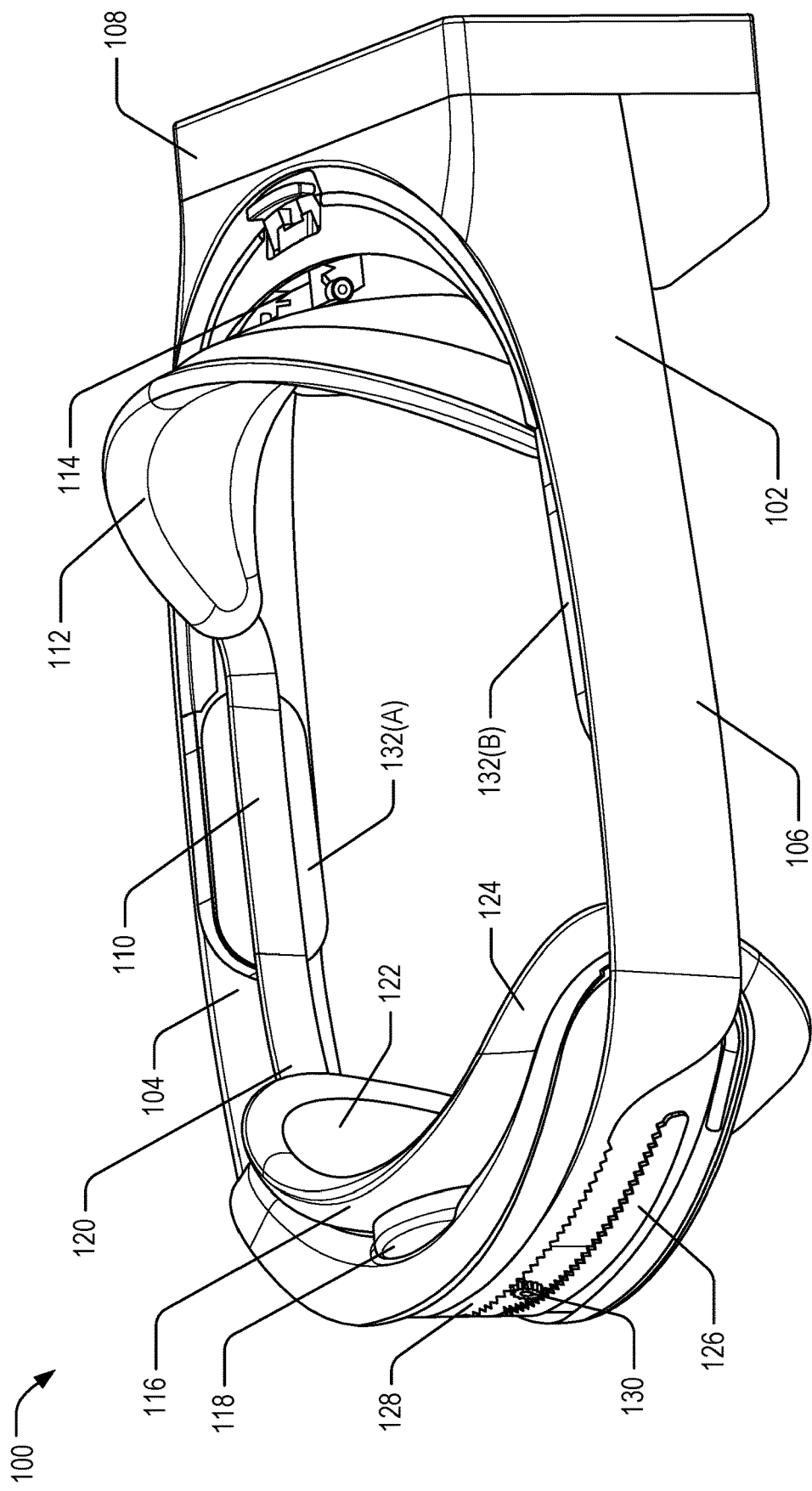
FIG. 1 illustrates a 3-D side view of an example extended reality headset including an example stabilization device.

While conventional extended reality headsets allow users to view, create, consume, and share content, they are not without limitations. Extended reality headsets generally include a display structure, which is placed over a user's eyes and allows the user to "see" the extended reality and a mechanism to secure the display structure to the user's head. Conventional extended reality headsets rely on a single strap being tightly secured around the user's head in order to position the display structure relative to the user's face. However, such conventional extended reality headsets require the single strap being tight enough to adequately secure the display structure, causing the position of the display structure relative to the user's face dependent on the user's skull and facial structure, which can cause user discomfort and frustration. Thus, the described techniques provide functionality beyond what is provided in conventional extended reality headsets by incorporating an internal suspension system secured to the user's head and pivotably coupled to the display structure. In this way, an extended reality headset can be positioned and securely fastened to a user's head regardless of head shape, providing substantially uniform and distributed pressure on the user's head and a more comfortable fit for a greater number of head shapes and sizes.

As used herein, the term "virtual environment" or "extended reality environment" refers to a simulated environment in which users can fully or partially immerse themselves. For example, an extended reality environment can include virtual reality, augmented reality, mixed reality, etc. An extended reality environment can include objects and elements with which a user can interact. In many cases, a user participates in an extended reality environment using a computing device, such as a dedicated extended reality device. As used herein, the term "extended reality headset" refers to a computing device having extended reality capabilities and/or features. In particular, an extended reality headset can refer to a computing device that can present an extended reality graphical user interface. An extended reality headset can further display one or more visual elements within the extended reality graphical user interface and receive user input that targets those visual elements. For example, an extended reality headset can include, but is not limited to, a virtual reality device, an augmented reality device, or a mixed reality device. In particular, an extended reality device can include any device capable of presenting a full or partial extended reality environment. Nonlimiting examples of extended reality headsets can be found throughout this application.

For example, an extended reality headset (referred to herein as "headset") includes an external frame which can be substantially rigid and can define a general exterior shape of the headset. In at least one example, the external frame can have a first side piece and/or a second side piece coupled to the external frame. The first side piece and/or the second side piece can be located on opposite sides of the headset. In at least one example, the first side piece and/or the second side piece can be configured to move in a direction away from and/or towards the head of the user. The external frame can further be coupled to a display structure such that the display structure is configured to fit over at least a portion of the user's eyes. The display structure can include an electronic display that is capable of providing an extended-reality presentation, for example. In at least one example, the headset includes a front head-engaging structure configured to engage a front portion of a head of a user. In at least one example, the headset includes a rear head-engaging structure configured to engage a rear portion of a head of a user. In some examples, the front head-engaging structure and/or the rear head-engaging structure are coupled to the external frame.

The headset can also include a flexible strap. The flexible strap can be located inside the external frame and can be formed from one or more elastomeric materials, including relatively hard elastomeric materials such as polyamide, polypropylene, polyurethane and/or polyethylene, etc. and/or relatively soft materials such as a natural material (rubber, silk, cork, wool, felt, etc.), or a synthetic material (styrene-butadiene block copolymers, polyisoprene, ethylene propylene rubber, ethylene propylene diene rubber, silicone elastomers, fluoroelastomers, polyurethane elastomers, and nitrile rubbers, neoprene, polyester, etc.). The flexible strap can be secured to the head of the user. The flexible strap can be coupled to the front head-engaging structure and/or the rear head-engaging structure of the headset. For example, the flexible strap can be rotationally coupled to the external frame via a pivot point associated with the front head-engaging structure and/or an attachment point associated with the head-engaging structure. Applying tension to the flexible strap by the tensioning mechanism can cause the front head-engaging structure to translate toward the user or compress into the user, which enables the flexible strap to rotate along the pivot point to conform to the head of the user. Meanwhile, the external frame can control and/or stabilize the display structure relative to the head of the user.

In some examples, the flexible strap has a first end and a second end. The tensioning mechanism can further include an upper rack coupled to the first end of the flexible strap and/or a lower rack coupled to the second end of the flexible strap. Additionally, the tensioning mechanism can include a gear located between the upper rack and the lower rack. Rotation of the gear can cause the lower rack and the upper rack to move in opposite directions, causing tension to be applied or removed from the flexible strap.

In some examples, the tensioning mechanism is a first tensioning mechanism. The headset further includes a second upper rack coupled to the first side piece and/or a second lower rack coupled to the second side piece. Additionally, the second tensioning mechanism can include a second gear located between the second upper rack and the second lower rack, such that a rotation of the second gear can cause the second lower rack and the second upper rack to move in opposite directions. In some examples, this can cause the first side piece and/or the second side piece to move in a direction away from one another or toward one another.

In some examples, the headset can include a rear head-engaging structure coupled to the external frame. The rear head-engaging structure can include padding and can be configured to conform to a head when the headset is worn. For example, the rear head-engaging structure can include a polyethylene, polyurethane, and/or melamine foam, material, to name a few non-limiting examples.

In some examples, the rear head-engaging structure has a first end and a second end opposite the first end. Applying tension to the flexible strap can, for example, cause the first end of the rear head-engaging structure and/or the second end of the rear head-engaging structure to move in a direction towards a face. Additionally or alternatively, removing tension from the flexible strap can cause the first end of the rear head-engaging structure and/or the second end of the rear head-engaging structure to move in a direction towards the face.

In some examples, the display structure presents virtual data. For example, the display structure can include one or more display devices (e.g., electronic display(s), display screen(s), projector(s), lens(es), head-up display(s), etc.) capable of providing an extended reality presentation.

In some examples, the material of the flexible strap includes an elastomeric material, including relatively hard elastomeric materials such as polyamide, polypropylene, polyurethane and/or polyethylene, etc. and/or relatively soft materials such as a natural material (rubber, silk, cork, wool, felt, etc.), or a synthetic material (styrene-butadiene block copolymers, polyisoprene, ethylene propylene rubber, ethylene propylene diene rubber, silicone elastomers, fluoroelastomers, polyurethane elastomers, and nitrile rubbers, neoprene, polyester, etc.). In at least one example, an elastomeric material can allow the flexible strap to maintain flexibility and hold tension without substantially stretching along the length of the flexible strap.

In some examples, the material of the external frame includes polycarbonate ABS alloy (PC/ABS). Additionally or alternatively, other thermoplastics can be used (e.g., acrylonitrile butadiene styrene (ABS), polycarbonate (PC), aliphatic polyamides (PA, PPA), polyoxymethylene (POM), polymethyl methacrylate (PMMA), polypropylene (PP), polybutylene terephthalate (PBT), polyphenylsulfone (PPSU), polyether ether ketone (PEEK), polyetherimide (PEI), etc.). This allows the external frame to maintain a rigid shape, allowing the headset to secure to a head safely and comfortably.

In some examples, the external frame includes an audio component. For example, the audio component can be located on the first side piece and/or the second side piece. In some examples, the audio component includes of one or more speakers configured to provide audio output directly to a user. Additionally or alternatively, the audio component can include one or more microphones configured to generate audio data.

In this way, the present headset stabilization device improves current headset designs by incorporating a flexible strap rotationally coupled to a display structure via a pivot point, allowing a user to secure the display structure of the headset on the user's forehead independent of the user's head shape or pressing the display structure to the user's forehead. Additionally, external straps provide additional stabilization, providing a secure and comfortable headset fit.

These and other aspects are described further below with reference to the accompanying drawings. The drawings merely illustrate examples and should not be construed to limit the scope of the claims. For example, while examples are illustrated in the context of a particular headset for extended reality, the techniques can be implemented using any headset device.

Example Device

FIG. 1 illustrates a 3-D side view of an example extended reality headset 100 including an example headset stabilization device. For example, the headset 100 includes a substantially rigid external frame 102 which defines a general shape of the headset 100. For example, the external frame 102 can have a first side piece 104 and/or a second side piece 106, which can be located on opposite sides of the headset 100. External frame 102 can support a display structure 108.

The side pieces 104 and 106 of the external frame 102 can be coupled to a display structure 108. Coupling first side piece 104 and second side piece 106 of external frame 102 to display structure 108 can laterally stabilize the display structure. The external frame 102 can stabilize the display structure 108 relative to the head of the user and prevent the display structure 108 from rotating around a gaze axis which is perpendicular to a presentation surface of the display structure 108. The display structure 108 can include one or more display devices (e.g., electronic display screen(s), projector(s), lens(es), head-up display(s), etc.) capable of providing an extended reality presentation. For example, the display structure 108 can be located at a front end of the headset and can be positioned such that a top end of the display structure can contact at least a portion of the user's forehead and extend to cover at least a portion of the user's eyes. In some examples, the display structure 108 includes a content delivery system which can present media on a presentation surface. The content delivery system can include a near eye display (NED) to be worn on the face of the user such that visual content is presented to the user.

Content presented to the user may include, for example, one or more images, video, audio, tactile sensation, or a combination thereof.

In some examples, the headset 100 further includes a flexible strap 110. The flexible strap 110 can be located inside the external frame 102, such that the flexible strap 110 is located proximate the external frame 102 and the head of the user when in use. The flexible strap 110 can be coupled to the external frame 102. The flexible strap 110 can configure the headset 100 to be secured to the head of the user. The flexible strap 110 can be formed from one or more elastomeric materials, such as a natural material (rubber, silk, cork, wool, felt, etc.), or a synthetic material (styrene-butadiene block copolymers, polyisoprene, ethylene propylene rubber, ethylene propylene diene rubber, silicone elastomers, fluoroelastomers, polyurethane elastomers, and nitrile rubbers, neoprene, polyester, etc.). In some examples, the flexible strap 110 can be coupled to a front head-engaging structure 112 of the headset 100. In some examples, a hinge can pivotably couple the external frame 102 to the front head-engaging structure 112 of the headset 100.

The front head-engaging structure 112 can be located at a front of the headset 100 and can be configured to contact at least a portion of the user's forehead. The front head-engaging structure 112 can be covered in a cushioned material (e.g., polyethylene, polyurethane, melamine foam, etc.) such that the front head-engaging structure 112 can comfortably conform to the user's forehead.

In some examples, the front head-engaging structure 112 can be rotationally coupled to the flexible strap 110 via a pivot point 114 to account for differences in facial shape and geometry in various users. As an illustrative example, a user may have a forehead that protrudes outward from the user's face. Conventional headsets may be configured to rest a display structure directly upon the user's forehead. Not only can this cause uneven and uncomfortable pressure on the user's forehead compared to the rest of the user's face in contact with the display portion, but the user's forehead shape also may cause the conventional display structure to be tilted down, distorting the user's view of the content presented in the display structure. Alternatively, a user may have large and/or protruding cheeks. Rather than tilting down, the display structure may be tilted up, such that the bottom of the display structure is located farther away from the user's forehead. Similarly, this may cause greater and unequal pressure on the user's cheeks, as well as a distorted view of the content presented in the display structure.

To overcome shortcomings of conventional headsets, the pivot point 114 acts as a datum along which the front head-engaging structure 112 rotates along a z-axis. Thus, the front head-engaging structure 112 allows the user to comfortably position the headset 100 without compromising the position of the display structure 108. In other words, the front head-engaging structure 112 can tilt along the pivot point 114 to accommodate for differences in users' facial geometry, without altering the tilt of the display structure.

In some examples, the headset 100 includes a rear head-engaging structure 116 to provide additional comfort and stabilization. For example, the rear head-engaging structure 116 is located at the back of the headset. Side pieces 104 and 106 of external frame 102 can be slidably received into a slot of the rear head-engaging structure 116. Rear head-engaging structure 116 can be coupled to the external frame 102 via an attachment point 118. In some examples, the rear head-engaging structure 116 can be attached to the attachment point 118 such that the rear head-engaging structure 116 can rotate clockwise and/or counterclockwise on the attachment point 118. In various examples, attachment point 118 can couple flexible strap 110 to external frame 102. Similar to the front head-engaging structure 112, the rear head-engaging structure can be made of a material configured to conform to the back of the user's head, such as polyethylene, polyurethane, and/or melamine foam, to name a few non-limiting examples.

In some examples, the rear head-engaging structure 116 can be coupled to the flexible strap 110 to customize the fit of the rear head-engaging structure 116 to the back of the user's head. For example, the flexible strap 110 can have a first end 120 and/or a second end (not pictured). Additionally or alternatively, the rear head-engaging structure 116 can have a first end 122 and/or a second end 124. In some examples, the first end 120 of the flexible strap 110 can be attached to the first end 122 of the rear head-engaging structure. Additionally or alternatively, the second end of the flexible strap 110 can be attached to the second end 124 of the rear head-engaging structure 116. In some examples, applying tension to the inner strap 110 can cause the first end 122 of the rear head-engaging structure 116 and/or the second end 124 of the rear head-engaging structure 116 to flex in a direction towards the user's head. Alternatively, removing tension from the flexible strap 110 can cause the first end 122 of the rear head-engaging structure 116 and/or the second end 124 of the rear head-engaging structure to flex out in a direction away from the user's head. In this way, the flexible strap 110 of headset 100 can further conform the headset 100 to fit around the user's head, providing a secure and comfortable fit and external frame 102 can stabilize the display structure 108 relative to the head of a user.

While the flexible strap is depicted as being one strap, multiple flexible straps are anticipated in some instances. For example, the flexible strap 110 may be a first flexible strap, and the headset may further include a second flexible strap (not pictured) having a third end and a fourth end. For example, the first end of the first flexible strap 110 may be attached to the first end of the rear head-engaging structure 116 and the second end of the first flexible strap 110 may be attached to the front head-engaging structure 112. Additionally or alternatively, the third end of the second flexible strap may be attached to the second end of the rear head-engaging structure 116 and the fourth end of the second flexible strap may be attached to the front head-engaging structure 112.

In some examples, the external frame 102 and the flexible strap 110 can be adjustable to fit a head shape and size of any user and/or to stabilize the display structure 108 relative to the head of a user, respectively. The external frame 102 can, as depicted in FIG. 1, include a telescoping mechanism that can allow the first side piece 104 and/or the second side piece 106 to move in a direction away from and/or a direction towards the user's head. For example, the external frame 102 can rely on a first tensioning mechanism located at a back of the headset 100. The tensioning mechanism, in various examples, can represent various size adjusting mechanisms. In at least one example, the tensioning mechanism can represent a ratcheting mechanism. The first side piece 104 can be coupled to a first lower rack 126. Additionally or alternatively, the second side piece can be coupled to a first upper rack 128 located substantially parallel and below the first lower rack 126. The first upper rack 128 and/or the first lower rack 126 can include teeth-like ridges extending toward a first gear 130 located between the first upper rack 128 and the first lower rack 126 such that a rotation of the first gear 130 can cause the first upper rack 128 and the first lower rack 126 to move in opposite directions.

In some examples, applying an outward force to the first side piece 104 and/or the second side piece 106, such as pulling the first side piece 104 and the second side piece 106 in opposite directions, can cause the first gear 130 to move counterclockwise. This can cause the first upper rack 128 and the first lower rack 126 to move in a direction away from one another, causing the first upper rack 128 to move in a direction right of the first gear 130 and the lower rack 126 to move in a direction left of the gear 130. Thus, the first side piece 104 and the second side piece 106 can move in a direction away from one another, creating a larger area to fit around a user's head and extending a width of the headset.

Alternatively, applying an inward force to the first side piece 104 and/or the second side piece 106, such as pushing the first side piece 104 and the second side piece 106 in the same direction, can cause the gear 130 to move clockwise. This can cause the upper rack 128 and the lower rack 126 to move in a direction towards one another, causing the upper rack 128 to move in a direction left of the gear and the lower rack 126 to move in a direction right of the gear. Thus, the first side piece 104 and the second side piece 106 can move in a direction towards one another, shrinking the width of the headset. In this way, the tensioning mechanism can support outer moments, stabilizing the display structure 108 relative to the head of a user.

Similar to the external frame 102, the flexible strap 110 can additionally or alternatively have a second tensioning mechanism located behind the rear head-engaging structure 116. Although not depicted in FIG. 1, the first end 120 of the flexible strap 110 can be coupled to a second lower rack, and the second end of the flexible strap 110 can be coupled to a second upper rack located substantially parallel and below the second lower rack. The second upper rack and/or the second lower rack can include teeth-like ridges extending toward a gear such that a rotation of the second gear can cause the second upper rack and the second lower rack to move in opposite directions. In some examples, rotating the front head-engaging structure 112 of the headset 100 in a direction away from the user's forehead can cause the second gear to move in a clockwise direction. This can cause the second upper rack and the second lower rack to move in a direction away from one another, causing the second upper rack to move in a direction right of the second gear and the second lower rack to move in a direction left of the second gear. Thus, a downward rotational moment can occur at the pivot point 114, causing the front head-engaging structure 112 of the headset to rotate in a direction towards the user's forehead to secure the headset 100 to the head of the user.

Alternatively, rotating the front head-engaging structure 112 of the headset 100 upward in a direction toward the user's forehead can cause the second gear to move in a counterclockwise direction. This can cause the second upper rack and the second lower rack to move in a direction toward one another, causing the second upper rack to move in a direction left of the second gear and the second lower rack to move in a direction right of the second gear. Thus, an upward rotational moment can occur at the pivot point 114, causing the front head-engaging structure 112 of the headset to rotate in a direction away from the user's forehead, thereby releasing pressure on the head of the user.

In some examples, the external frame includes an audio component(s) 132(A) and/or 132(B). Audio component 132 (A) can be located on at least a portion of the first side piece 104, and the audio component 132(B) can be located on at least a portion of the second side piece 106 such that when the headset 100 is worn, the audio component 132(A) and/or the audio component 132(B) can cover at least a portion of the user's ear. In some examples, audio components 132(A) and 132(B) can include one or more speakers (not pictured) configured to provide audio output directly to the ears of the user. The audio output can be sound associated with the visual content being concurrently displayed to the user, while in other cases, the audio output can be standalone content. Additionally or alternatively, audio components 132(A) and 132(B) can include one or more microphones (not pictured) configured to generate microphone audio data representative of noise in an environment surrounding the user, such as, for instance, words spoken by the user.

Figure 2:
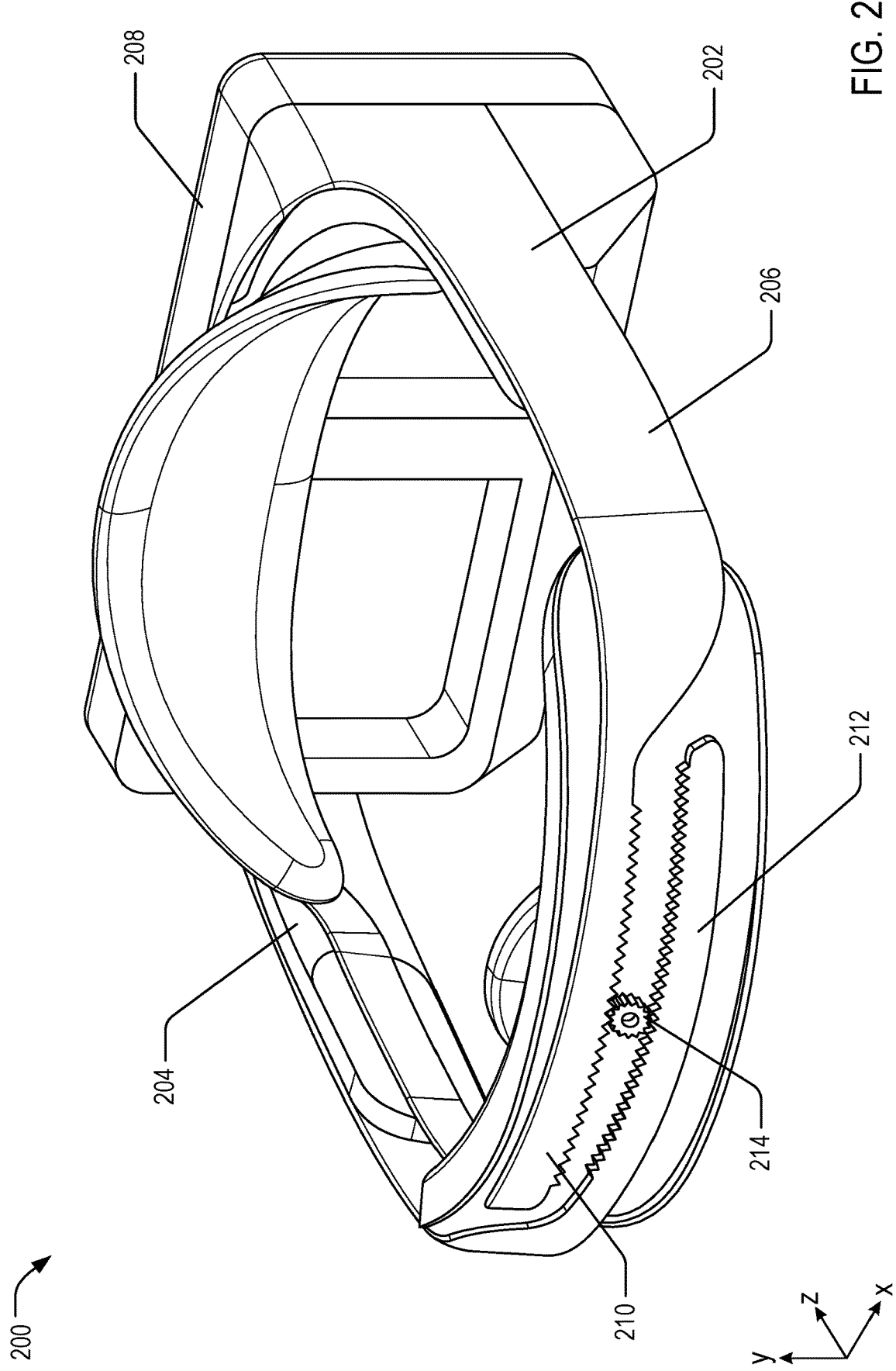
FIG. 2 illustrates a 3-D view taken along a z-axis of an example extended reality headset including an example first tensioning mechanism of an example stabilization device.

FIG. 2 illustrates a 3-D view taken along a z-axis of an example extended reality headset including an example first tensioning mechanism of an example stabilization device. For example, the headset 200 includes an external frame 202. In some examples, the external frame 202 has a first side piece 204 and/or a second side piece 206 extending from a front of the headset 200 (toward a face of a user) to a back of the headset 200 (towards a back of the user's head). The external frame 202, the first side piece 204 and/or the second side piece 206 can be formed from one or more substantially rigid or semi-rigid polymers (e.g., polycarbonate, acrylonitrile-butadiene-styrene (ABS), polycarbonate/acrylonitrile-butadiene-styrene terpolymer blend (PC/ABS), polycarbonate-ABS, acrylic, nylon, polyvinyl chloride (PVC), high-density polyethylene (HDPE), etc.). In examples, the external frame 202 enables a display structure 208 to remain stable. For example, a torque can be applied to the display structure 208, such as twisting the display structure 208 along a z-axis, creating a moment at the front of the headset 200. Because the first side piece 204 and the second side piece 206 can be comprised of a rigid material fixed to the back of the headset 200, the first side piece 204 and the second side piece 206 can resolve the moment that the torque imparts at the front of the headset 200. In other words, the external frame 202 can stabilize the headset by preventing rotation of the headset 200 in the z-direction.

In some examples, the headset 200 includes a first tensioning mechanism which can enable a user to adjust the headset to 200 to fit a width of the user's head while stabilizing the display structure relative to the head of the user. For example, the external frame 202 can include a first upper rack 210 coupled to the first side piece 204 and/or a first lower rack 212 coupled to the second side piece 206. A first gear 214 (e.g., an eyela spur gear) can be disposed between the first upper rack 210 and the first lower rack 212 such that a rotation of the gear 214 causes the first upper rack 210 and the first lower rack 212 to move in opposite directions. For example, the first upper rack 210 and/or the first lower rack 212 can include teeth-like ridges extending towards the first gear 214. The first gear 214 can fit in a space between the teeth-like ridges, allowing a rotation of the first gear 214 to cause the first upper rack 210 and the first lower rack 212 to move an equal distance in opposite z-directions.

As an illustrative example, a user may wish to widen the external frame 202 to enable the headset 200 to fit around a larger-sized head while stabilizing the display structure relative to the head of the user. By applying force to the first side piece 204 in a negative x-direction and/or the second side piece 206 in a positive x-direction, the force(s) can cause the first upper rack 210 to move in the positive x-direction and/or the first lower rack 212 to move in the negative x-direction. In some examples, the first upper rack 210 and the first lower rack 212 can move in substantially equal, but opposite, directions.

Alternatively, a user may wish to narrow the width of the external frame 202 to enable the headset 200 to fit around a smaller-sized head while stabilizing the display structure relative to the head of the user. By applying a force to the first side piece 204 in the positive x-direction and/or the second side piece 206 in the negative x-direction, the force can cause the first upper rack 210 to move in the positive x-direction and/or the first lower rack 212 to move in the negative x-direction.

In some examples, the first tensioning mechanism can include a locking mechanism (not pictured) which can enable the user to lock the first upper rack 210 and/or the second upper rack 212 in a set position. For example, once the headset 200 is positioned and secured on the user's head, the user can lock the first tensioning mechanism in place such that the display structure remains stable throughout use. Additionally, the locking mechanism can include a release (e.g., push-button release) to unlock the first upper rack 210 and/or the first lower rack 212, allowing the user to adjust the width of the headset 200.

Figure 3:
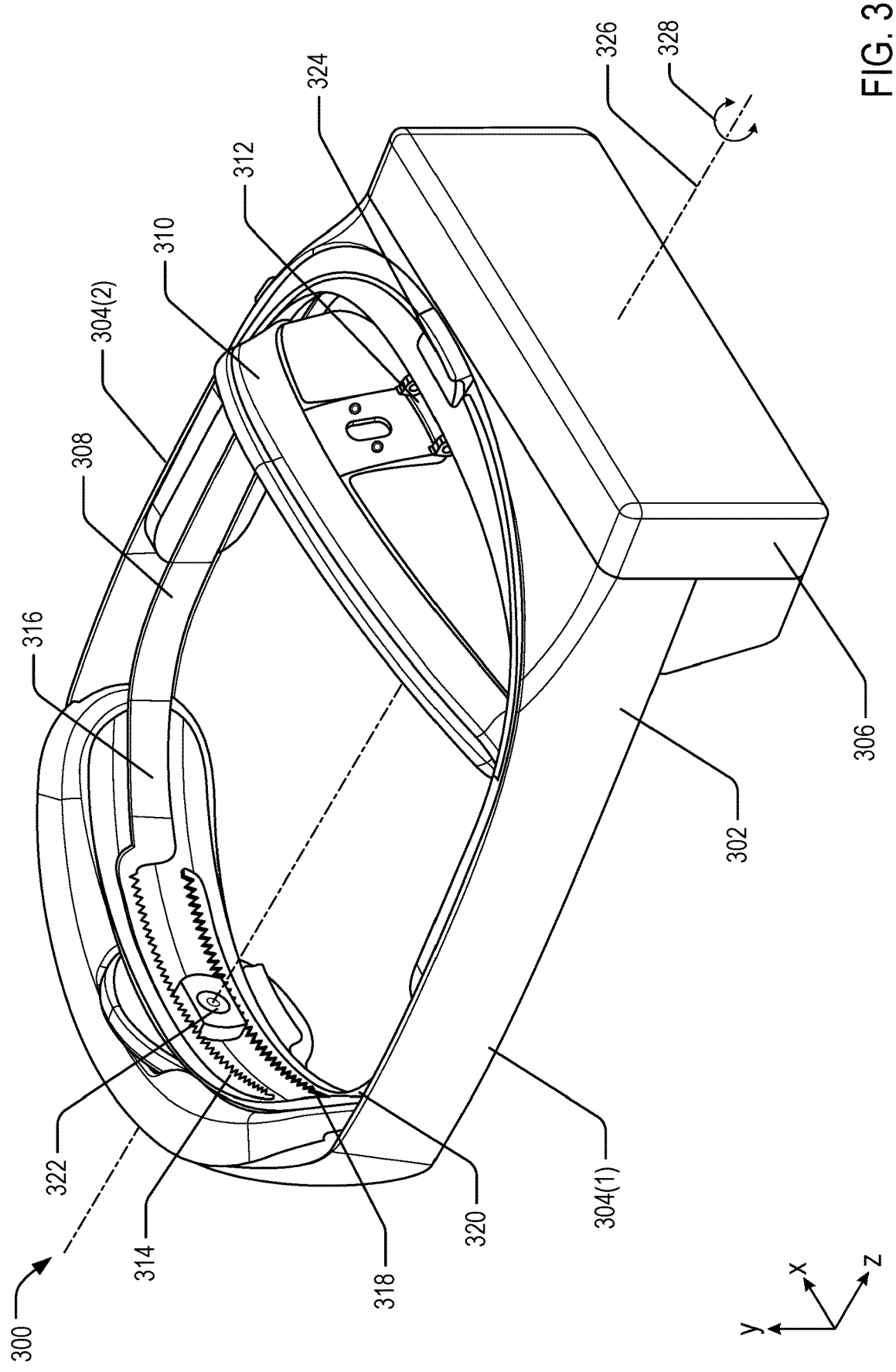
FIG. 3 illustrates a 3-D view taken along a z-axis of an example extended reality headset including an example second tensioning mechanism of an example stabilization device.

FIG. 3 illustrates a 3-D perspective view taken along a z-axis of an example extended reality headset 300 including an example second tensioning mechanism of an example stabilization device. The headset 300 can be the same or similar to headsets 100 and 200. For example, the headset 300 can include an external frame 302 having a first side piece 304(1) and a second side piece 304(2) extending from a front of the headset 300 (toward a face of a user) to a back of the headset 300 (towards a back of the user's head). The external frame 302 can be coupled to a display structure 306 configured to present extended reality. The external frame 302 can stabilize the display structure 306 relative to the head of the user.

In some examples, the headset 300 can include a flexible strap 308. The flexible strap 308 can be located inside the external frame 302 and can secure the headset 300 to the head of a user. The flexible strap 308 can include an elastomeric material, such as a natural material (rubber, silk, cork, wool, felt, etc.), or a synthetic material (styrene-butadiene block copolymers, polyisoprene, ethylene propylene rubber, ethylene propylene diene rubber, silicone elastomers, fluoroelastomers, polyurethane elastomers, and nitrile rubbers, neoprene, polyester, etc.). In some examples, the flexible strap 308 can be coupled to a front head-engaging structure 310 of the headset 300. The front head-engaging structure 112 can be located at the front of the headset 300 and configured to contact at least a portion of a user's forehead. The front head-engaging structure can be covered in a cushioned material such that the front head-engaging structures 310 can comfortably conform to the user's forehead.

In some examples, the front head-engaging structure 310 can be rotationally coupled to the external frame 302 via a pivot point 312. For example, the pivot point 312 can act as a datum along which the front head-engaging structure 310 rotates along the z-axis without compromising the position of the display structure. Further, the pivot point 312 can account for differences in facial shape and geometry in various users. In other words, the front head-engaging structure 310 can tilt along the pivot point 312 to accommodate for differences in users' facial geometry, without altering the tilt of the display structure 306.

In some examples, the headset 300 can include a second tensioning mechanism, similar to the first tensioning mechanism described in FIG. 2, to enable the user to adjust the tilt of the front head-engaging structure 310 of the headset to 300 in the z-direction to conform to the user's facial geometry. For example, the second tensioning mechanism can include a second upper rack 314 coupled to a first end 316 of the flexible strap and/or a second lower rack 318 coupled to a second end of the flexible strap 320. A second gear 322 (e.g., an eyela spur gear) can be disposed between the second upper rack 314 and the second lower rack 318 such that a rotation of the second gear 322 causes the second upper rack 314 and the second lower rack 318 to move in opposite directions. For example, the second upper rack 314 and/or the second lower rack 318 can include teeth-like ridges extending towards the second gear 322. The second gear 322 can fit in a space between the teeth-like ridges, allowing a rotation of the second gear 322 to cause the second upper rack 314 and the second lower rack 318 to move an equal distance in the opposite z-directions.

In some examples, moving the second upper rack 314 and/or the second lower rack 318 in the z-direction can cause the front head-engaging structure 310 to rotate along the z-axis. For example, a user may wish to move the front head-engaging structure 310 to fit large or protruding cheeks or cheekbones. By applying force to the front head-engaging structure 310 in a negative z-direction, the force can create tension in the flexible strap 308, causing the second upper rack 314 to move in the positive z-direction and/or the second lower rack 318 to move in the negative z-direction, rotating the front head-engaging structure in the negative z-direction. In some examples, the second upper rack 314 and the second lower rack 318 can move in substantially equal, but opposite, directions.

Alternatively, the user may wish to move the front head-engaging structure 310 to fit large or protruding forehead. By applying force to the front head-engaging structure 310 in a positive z-direction, such as pulling the front head-engaging structure 310 away from a face of the user, the force can create tension in the flexible strap 308. This can cause the second upper rack 314 to move in the negative z-direction and/or the second lower rack 318 to move in the positive z-direction, rotating the front head-engaging structure in the positive z-direction. In some examples, the second upper rack 314 and the second lower rack 318 can move in substantially equal, but opposite, directions.

In some examples, the first tensioning mechanism can include a locking mechanism 324 which can enable the user to lock the second upper rack 314 and/or the second lower rack 318 in a position. For example, once positioned and secured on the user's head, the user can lock the second tensioning mechanism in place such that the headset remains secure through use. Additionally, the locking mechanism 324 can include a release (e.g., push-button release) to unlock the second upper rack 314 and/or the second lower rack 318, allowing the user to adjust the angle of the front head-engaging structure 310.

The gaze direction of a user can be referred to as a gaze axis, 326. The external frame 302 can enhance stabilization of the display structure 306 by resisting motion of the display structure 306, such as by minimizing rotation around the gaze axis 326 illustrated by the double-sided arrow 328. Such stabilization can maintain proper orientation of the display structure relative to the gaze axis to avoid unsatisfactory user experience including motion sickness, headaches, eye strain, etc.

Figure 4:
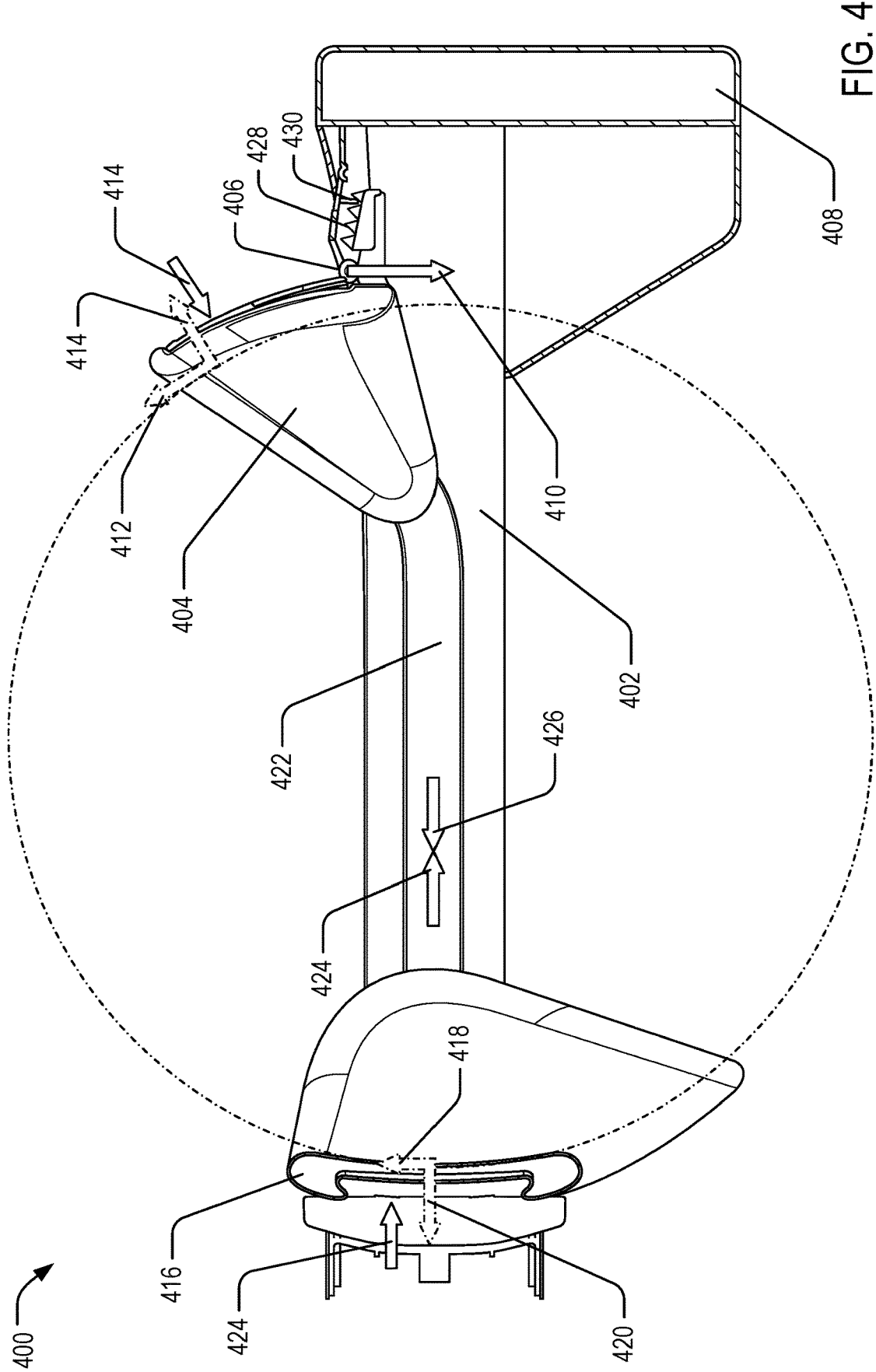
FIG. 4 illustrates a side view of forces imparted on an example headset stabilization device by an example flexible strap.

FIG. 4 illustrates a side view of forces imparted on an example headset stabilization device 400 by an example flexible strap. The headset 400 can be the same or similar to the headsets 100, 200, and 300.

In some examples, the headset 400 can include an external frame 402 coupled to a front head-engaging structure 404 via a pivot point 406. The headset 400 can also include a display structure 408. In some examples, multiple forces are imparted on the headset 400 while being worn on the head of a user. For example, the headset 400 can have forces 410 in the negative y-axis based at least in part on the weight of the front head-engaging structure 404 and inertial forces. The front head-engaging structure 404 can include a force of friction 412 and an opposite normal force 414. For example, when the headset is secured to the head of the user, the force of friction 412 and the normal force 414 can be of equal but opposite magnitudes.

In some examples, the headset 400 can additionally or alternatively include a rear head-engaging structure 416. The rear head-engaging structure 416 can impart forces similar to the front head-engaging structure 404. For example, the rear head-engaging structure 416 can include a force of friction 418 and an opposite normal force 420. For example, when the headset 400 is secured to the head of the user, the force of friction 418 and the normal force 420 can be of equal but opposite magnitudes.

In some examples, the headset 400 includes a flexible strap 422. The flexible strap 422 can be coupled to the front head-engaging structure 404 and/or the rear head-engaging structure 416, such that tension on the flexible strap 422 can cause the front head-engaging structure 404 and/or the rear head-engaging structure 416 to move. When the headset 400 is being worn by a user and at rest, the front head-engaging structure 404 can impart a force 424 on the flexible strap 422 in the positive x-direction. The flexible strap 422 can counter this with an equal but opposite normal force 426 in the negative x-direction, maintaining a sum force of zero.

In the illustrated example, the headset 400 includes a linear adjustment mechanism 428. Linear adjustment mechanism 428 can be configured to adjust spacing between the display structure and the front head-engaging structure. For example, linear adjustment mechanism 428 can include teeth as part of a ratcheting mechanism that can be used with a selection mechanism 430 as shown. In some examples (not shown), linear adjustment mechanism 428 may omit teeth and employ a pressure-fit mechanism as part of selection mechanism 430 for fine-tuning fit. Adjustment of the distance between the front head-engaging structure 404 and the display structure 408 as enabled by linear adjustment mechanism 428 can help to avoid unsatisfactory user experience including motion sickness, headaches, eye strain, etc. by providing a mechanism to customize the spacing according to a preferences and/or needs of a particular user without interfering in the fit of the headset.

FIG. 5 illustrates a side view of an example headset 500 with an example stabilization device including an example rear head-engaging structure. The headset 500 can be the same or similar to headsets 100, 200, 300, and 400.

In some examples, the headset 500 includes a rear head-engaging structure 502 to provide additional comfort and stabilization. For example, the rear head-engaging structure 502 can be located at the back of the headset 500 and can be coupled to an external frame 504. In some examples, the rear head-engaging structure 502 can be coupled to an attachment point 506 such that the rear head-engaging structure 502 rotates clockwise and/or counterclockwise on the attachment point.

In some examples, the rear head-engaging structure 502 is coupled to a flexible strap (not pictured) which can cause the rear head-engaging structure to fit to the back of a user's head when the headset 500 is worn. For example, the flexible strap can be coupled to a first end and/or a second end of the rear head-engaging structure. Applying tension to the inner strap can cause, for example, the first end of the rear head-engaging structure and/or the second end of the rear head-engaging structure to flex in a direction towards the user's head. Alternatively, removing tension from the flexible strap can cause the first end of the rear head-engaging structure or the second end of the rear head-engaging structure to flex out in a direction away from the user's head.

In some examples, the inner strap can be coupled to a front head-engaging structure 508 of the headset 500 such that applying tension to the inner strap causes the front head-engaging structure 508 to rotate along a pivot point 510. In some examples, the front head-engaging structure 508 can be coupled to the rear head-engaging structures 502 such that the first end of the rear head-engaging structure 502 and/or the second end of the rear head-engaging structure 502 can flex based at least in part on a position of the front head-engaging structure 508. For example, the front head-engaging structure 508 flexing in a direction away from the rear head-engaging structure 502 can cause the first end of the rear head-engaging structure 502 and/or the second end of the rear head-engaging structure 502 to flex in a direction away from the user's head. Alternatively, the front head-engaging structure 508 flexing in a direction towards the rear head-engaging structure 502 can cause the first end of the rear head-engaging structure and/or the second end of the rear head-engaging structure 502 to flex in a direction toward the user's head. In this way, the headset 500 can further conform to fit around the user's head, providing a secure and comfortable fit.

CONCLUSION

Although the discussion above sets forth example implementations of the described techniques, other architectures can be used to implement the described functionality and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A headset comprising:
    a front head-engaging structure configured to engage a front portion of a head of a user;
    a flexible strap configured to secure the front head-engaging structure to the head of the user, wherein the flexible strap has a first end and a second end;
    an external frame coupled to the front head-engaging structure via a pivot point such that the front head-engaging structure is configured to rotate in a direction towards the front portion of the head of the user while maintaining a tilt of an electronic display relative to the head of the user; and
    a display structure coupled to and supported by the external frame, the display structure comprising the electronic display configured to present content to the user.

2. The headset of claim 1, wherein the front head-engaging structure comprises a hinge by which the external frame is pivotably coupled to the front head-engaging structure.

3. The headset of claim 1, further comprising a linear adjustment mechanism by which a spacing between the display structure and the front head-engaging structure is adjustable.

4. The headset of claim 1, further comprising a rear head-engaging structure coupled to the external frame via an attachment point such that the rear head-engaging structure is configured to rotate clockwise or counterclockwise about the attachment point.

5. The headset of claim 4, wherein:
the rear head-engaging structure comprises a slot; and
the external frame comprises first and second side pieces that are slidably received in the slot.

6. The headset of claim 4, further comprising a tensioning mechanism configured to apply tension to the flexible strap, wherein the tensioning mechanism is configured to:
apply tension to the flexible strap to cause at least one of a first end of the rear head-engaging structure or a second end of the rear head-engaging structure to move in a direction towards a face of the user; and
remove the tension from the flexible strap to cause at least one of the first end of the rear head-engaging structure or the second end of the rear head-engaging structure to move in a direction away from the face of the user.

7. The headset of claim 1, wherein the external frame includes a first side piece and a second side piece, the headset further comprising:
a tensioning mechanism comprising:
an upper rack coupled to the first side piece;
a lower rack coupled to the second side piece; and
a gear located between the upper rack and the lower rack, wherein rotation of the gear is configured to cause the upper rack and the lower rack to move in opposite directions, and to cause the first side piece and the second side piece to move in a direction away from one another or towards one another.

8. The headset of claim 1, wherein the external frame includes a first side piece and a second side piece coupled to the display structure and configured to laterally stabilize the display structure.

9. The headset of claim 1, wherein the external frame includes an audio component including a speaker or a microphone.

10. The headset of claim 1, wherein the external frame is substantially rigid and configured to resist rotation of the display structure relative to the head of the user.

11. A device comprising:
a display structure including an electronic display configured to present content to a user;
an external frame including a first side piece and a second side piece coupled to the display structure and configured to resist rotation of the display structure; and
a front head-engaging structure rotationally coupled to the external frame via a pivot point such that the front head-engaging structure is configured to rotate in a direction toward a forehead of the user while maintaining a tilt of the electronic display relative to the forehead of the user.

12. The device of claim 11, further comprising a rear head-engaging structure including a tensioning mechanism, wherein the rear head-engaging structure is coupled to the external frame.

13. The device of claim 12, further comprising:
a flexible strap having a first end and a second end; and
a tensioning mechanism coupled to the flexible strap, the tensioning mechanism comprising:
an upper rack coupled to the first end of the flexible strap
a lower rack coupled to the second end of the flexible strap; and
a gear located between the upper rack and the lower rack, wherein a rotation of the gear is configured to cause the lower rack and the upper rack to move in opposite directions, and to cause tension to be applied or removed from the flexible strap.

14. The device of claim 13, wherein the tensioning mechanism is a first tensioning mechanism, the device further comprising a second tensioning mechanism comprising:
a second upper rack coupled to the first side piece;
a second lower rack coupled to the second side piece; and
a second gear located between the second upper rack and the second lower rack, wherein a rotation of the second gear is configured to cause the second lower rack and the second upper rack to move in opposite directions, and to cause the first side piece and the second side piece to move in a direction away from one another or towards one another.

15. The device of claim 11, further comprising a rear head-engaging structure coupled to the external frame, wherein the rear head-engaging structure includes padding and is configured to conform to a head when worn.

16. The device of claim 11, further comprising a linear adjustment mechanism configured to adjust spacing between the display structure and the front head-engaging structure.

17. A method of positioning a headset, the method comprising:
moving a display structure of the headset in a direction of a forehead of a user, the display structure coupled to a flexible strap;
activating a tensioning mechanism associated with adjusting the flexible strap; and
pivoting, based at least in part on activating the tensioning mechanism, a front head-engaging structure of the headset rotationally coupled to the flexible strap and located proximate to the display structure, such that the front head-engaging structure is located proximate to the forehead.

18. The method of claim 17, wherein the tensioning mechanism includes a locking mechanism configured to enable the user to lock the tensioning mechanism in a set position.

19. The method of claim 17, wherein pivoting the front head-engaging structure of the headset along a pivot point causes the front head-engaging structure of the headset to secure to the forehead.

20. The method of claim 17, wherein the front head-engaging structure is coupled to an external frame including a first side piece and a second side piece configured to adjust a width of the external frame while laterally stabilizing the display structure.

* * * * *